Nov. 12, 1946. W. W. KIRTON 2,410,979
GANTRY
Filed April 7, 1945 3 Sheets-Sheet 1

Inventor
Wilford W. Kirton
By Clarence A. O'Brien
and Harvey B. Jacobson
Attorneys Nov. 12, 1946.  W. W. KIRTON  2,410,979
GANTRY
Filed April 7, 1945  3 Sheets-Sheet 3

Inventor
Wilford W. Kirton

By Clarence A. O'Brien
and Harvey B. Jacobson
Attorneys

Patented Nov. 12, 1946

2,410,979

UNITED STATES PATENT OFFICE 2,410,979

GANTRY

Wilford W. Kirton, Salt Lake City, Utah

Application April 7, 1945, Serial No. 587,137

2 Claims. (Cl. 212—13)

This invention relates to railroad repair shop equipment and has for an object to provide a gantry for hoisting trucks which have been removed from cars.

Another object of the invention is to provide a gantry type crane adapted to straddle a car track and pick up a truck and move the same to points where it may be worked upon.

A further object of the invention is to provide a gantry or traveling crane in which is fixed a transverse centrally disposed crane and a pair of oppositely disposed traveling cranes operating on each side thereof.

A still further object of this invention is to provide a gantry having a relatively wide bridge and a plurality of cranes thereon whereby a truck may be picked up bodily and parts thereof removed from the truck and carried away therefrom upon the gantry.

Another object of the invention is to provide a gantry through means of which a car truck may be completely dismantled.

Another object of the invention is to provide a safety, labor and time saving device for men dismantling trucks, a structure which is adapted to prevent truck side frames from coming in contact with or scarring wheel journal bearings and which is also suitable for changing out old and replacing new wheels.

A still further object of the invention is to provide a gantry adapted to pick up or hoist trucks which have been removed from cars in any and all railroad yards, terminals, repair shops or other facilities in any industry where railroad cars are used and whether or not said cars are used in state or interstate commerce.

Other features and advantages will become more readily apparent from the following description and the accompanying illustrative drawings in which:

Figure 5 is a detail side elevational view of a modified form of a traveling crane.

Figure 1:
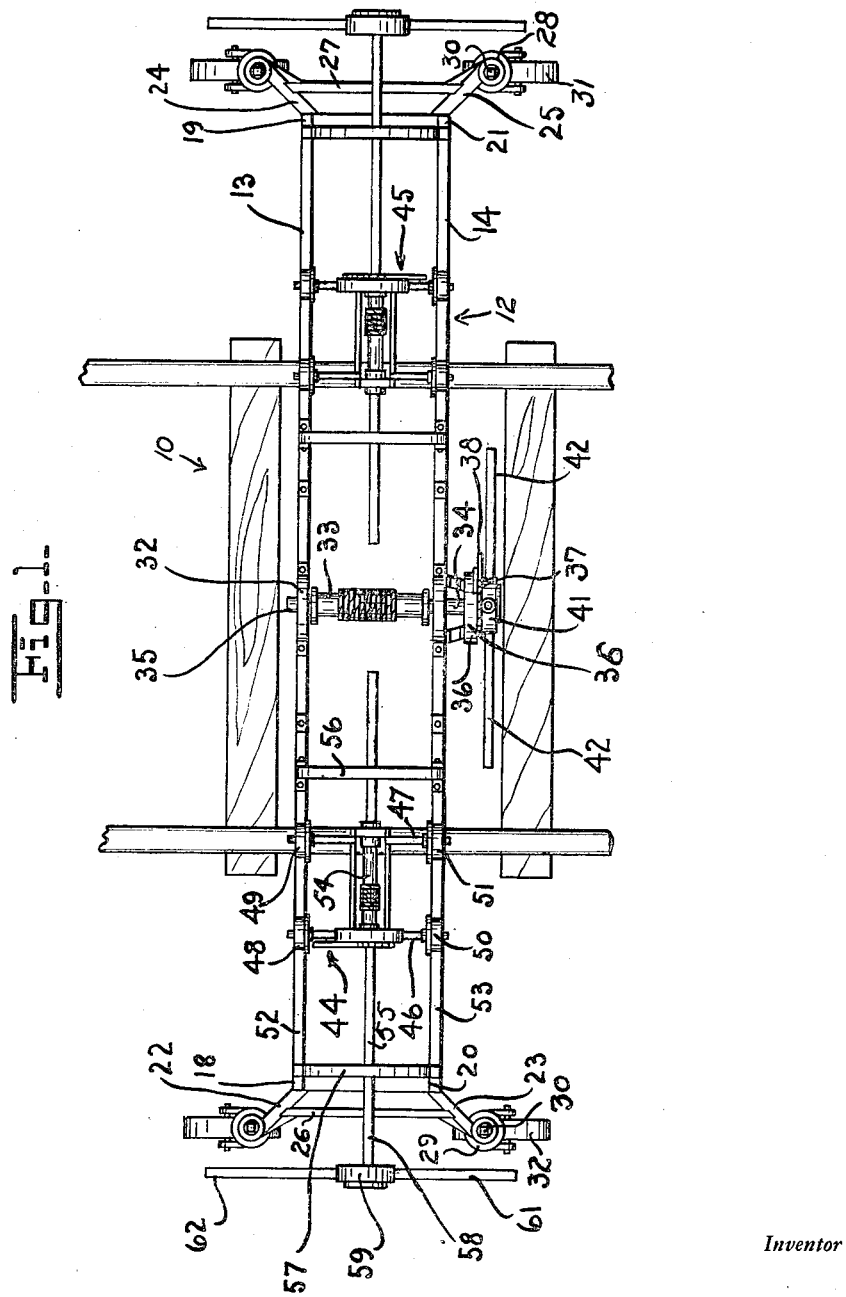
Figure 1 is a top plan view of my improved gantry.
Figure 2:
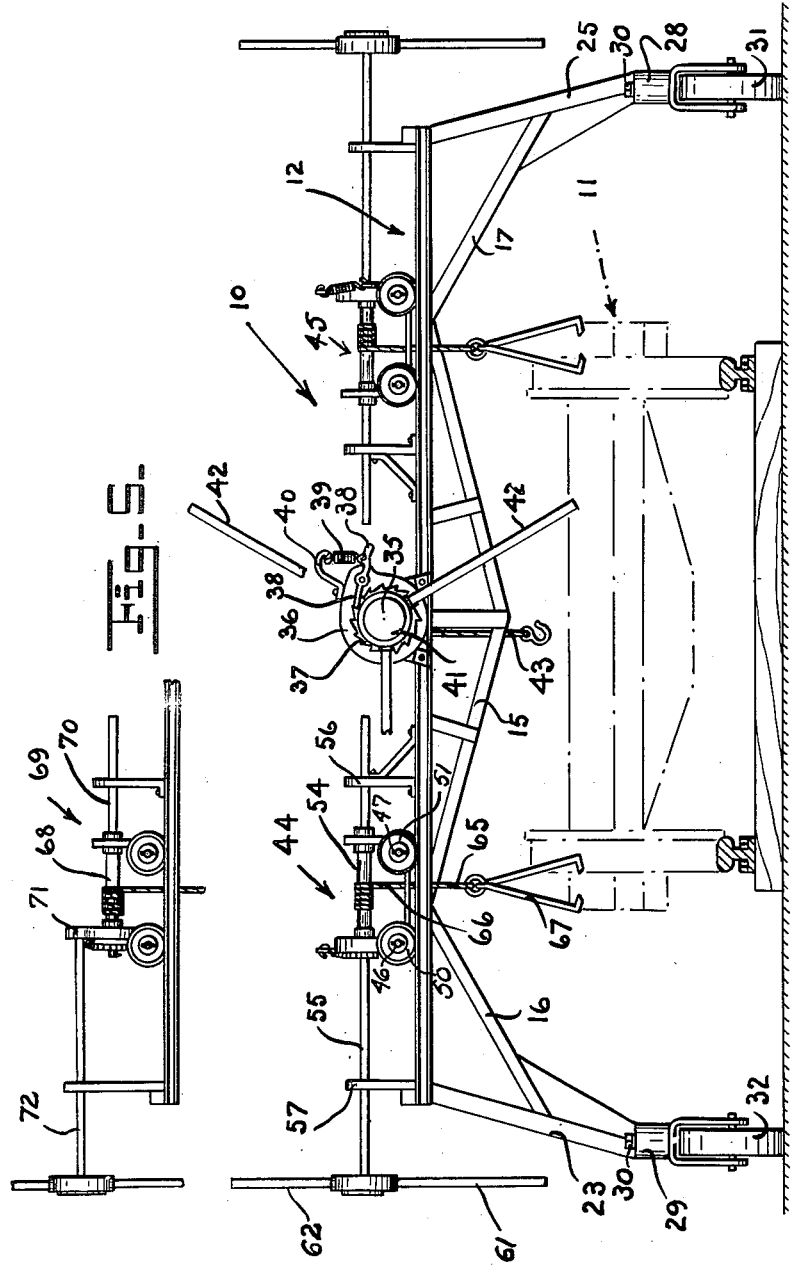
Figure 2 is a side elevational view thereof.
Figure 3:
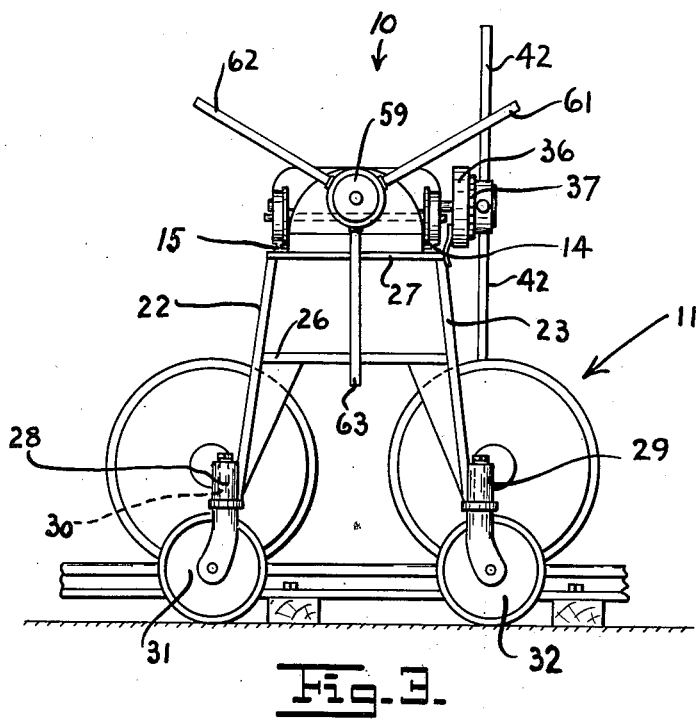
Figure 3 is an enlarged end elevation of the device.
Figure 4:
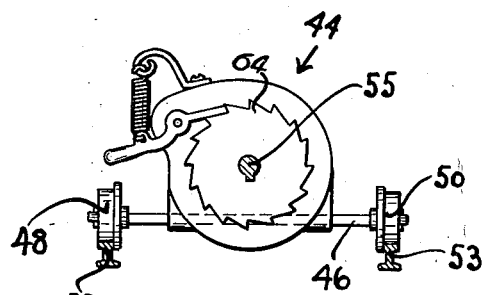
Figure 4 is an enlarged detail end view of a crane.

In the specification following and in the several views in the illustrative drawings accompanying and forming a part of the application for patent, the same reference characters indicate the same parts, and in which 10, indicates my improved gantry as a whole and 11, represents a car truck about to be operated upon by the gantry.

The gantry itself consists of a bridge 12, formed of a pair of spaced apart girder rails 13 and 14, supported by belly trusses 15, and braces 16 and 17. To the ends 18, 19, 20 and 21, of said rails are fixed inclined supporting legs 22, 23, 24 and 25, connected by cross bars 26 and 27. To the lower ends of each of said legs are fixed vertical bearings 28, 29, etc., for the spindles 30, of castor wheels 31 and 32.

Fixed to the center of each of the girders 13 and 14, are upright bearings 31 and 32, for a stationary transversely disposed winch 33, the end 34, of its shaft 35, projects rotatably through a relatively large disk 36 and next to the outer side of which is fixed on the shaft end 34, a ratchet wheel 37, adapted to be engaged by a pawl 38, controlled by a spring 39, one end of which is fixed to a bracket 40, on the member 36. Outwardly of the ratchet wheel and fixed on the shaft 35, is an operating wheel 41, having suitably spaced spoke levers 42, by means of which the winch is operated. On the drum of the winch is attached the chain 43, adapted to be carried around any desired part of the truck 11, which may then be lifted to a desired height for the removal of any of its parts, or for renewing parts.

On each end of the bridge 12, are traveling cranes 44 and 45, both of which are constructed and operate alike, and it will, therefore, only be necessary to detail the construction of one. Crane 44, is provided with two spaced apart axles 46 and 47, upon the ends of which are wheels 48, 49, 50 and 51, the first two operating upon the ends 52, of the member 13, and the second two upon the end 53, of member 14; said members 46 to 50, forming a truck for supporting the winch proper 54. This winch is provided with a longitudinal shaft 55, parallel to the girder rails 13 and 14, and disposed centrally thereof, said shaft being supported in upright bearings 56 and 57, through which bearings the shaft is slidably as well as rotatably mounted. On the extreme end 58 of the shaft is fixed the operating wheel 59, thereof, with its projecting spoke levers 61, 62 and 63. The load holding device 64, of the crane is of the same construction as that of the stationary crane, as before described. To the free end 65, of the winch chain 66, is secured a grapple 67, by means of which any loosened member of the truck 11, may be picked up and moved away from the truck and then deposited upon a hand-truck (not shown) or elsewhere.

In Figure 5, I show a modification of crane 44.

In this form, the winch 68, of the traveling crane 69, has its shaft 70, indirectly rotated from the gear box 71, through means of transmission gears (not shown) on the inner ends of the shaft 70, and the drive shaft 72.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A gantry comprising a longitudinally extending frame including a pair of spaced parallel extending tracks, frame supporting members secured to the opposite ends of said frame, casters supported on the lower ends of said frame supporting members, bracing trusses for said frame and its supporting members, a crane fixed to the central portion of said frame extending transversely thereof, means for operating said crane, spaced upright bearing members extending between said tracks fixed to the outer ends of said tracks and at points adjacent said centrally disposed crane, wheel supported cranes mounted on said tracks between said bearing members for longitudinal movement, combined guiding and crane operating shafts extending axially through said bearing members and said last named cranes, and shaft operating means on the outer ends of said shafts positioned beyond the lateral limits of said gantry.

2. A gantry comprising a longitudinally extending frame including a pair of spaced parallel extending tracks, frame supporting members secured to the opposite ends of said frame, casters supported on the lower ends of said frame supporting members, bracing trusses for said frame and its supporting members, a crane fixed to the central portion of said frame extending transversely thereof, means for operating said crane, spaced uprights bearing members extending between said tracks fixed to the outer ends of said tracks and at points adjacent said centrally disposed crane, wheel supported cranes mounted on said tracks between said bearing members for longitudinal movement therebetween, combined guiding and crane operating shafts extending axially through said bearing members and said last named cranes, shaft operating means on the outer ends of said shafts positioned beyond the lateral limits of said gantry, and spring projected dog and ratchet means associated with said cranes for supporting the load.

WILFORD W. KIRTON.